(12) United States Patent
Takahashi

(10) Patent No.: US 7,443,536 B2
(45) Date of Patent: Oct. 28, 2008

(54) METHOD OF GENERATING COLOR SEPARATION DATA AND IMAGE PROCESSING APPARATUS

(75) Inventor: Kosei Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 822 days.

(21) Appl. No.: 10/912,130

(22) Filed: Aug. 6, 2004

(65) Prior Publication Data

US 2005/0052669 A1 Mar. 10, 2005

(30) Foreign Application Priority Data

Aug. 11, 2003 (JP) .............................. 2003-291872

(51) Int. Cl.
*G06F 15/00* (2006.01)
*G06K 1/00* (2006.01)

(52) U.S. Cl. ........................................ 358/1.9; 358/1.8

(58) Field of Classification Search .................. 358/1.1, 358/1.2, 1.9, 1.6, 1.8, 1.12, 3.09, 3.1, 502, 358/515, 520, 403
See application file for complete search history.

(56) References Cited

U.S. PATENT DOCUMENTS

| | | | |
|---|---|---|---|
| 6,459,501 B1 * | 10/2002 | Holmes ....................... 358/1.9 |
| 6,682,170 B2 * | 1/2004 | Hotomi et al. ................. 347/43 |
| 6,712,462 B2 * | 3/2004 | Ito et al. ...................... 347/100 |
| 6,789,876 B2 * | 9/2004 | Barclay et al. ................. 347/37 |
| 6,846,353 B2 * | 1/2005 | Sano et al. .................. 106/31.6 |

FOREIGN PATENT DOCUMENTS

JP 8-085219 A 4/1996

* cited by examiner

*Primary Examiner*—Douglas Q. Tran
(74) *Attorney, Agent, or Firm*—Fitzpatrick, Cella, Harper & Scinto

(57) ABSTRACT

In a process of generating color separation data, if printing is performed with use of a particular color printing material in addition to basic printing material, the process can effectively use a gamut area which can be enlarged with use of the particular color printing material. Specifically, the process calculates a granularity for each equal-lightness line. For each of such equal-lightness lines, color separation data is obtained which relates to the mixture ratio of the yellow ink to the light magenta ink corresponding to the best granularity. Then, data on lattice points corresponding to the equal-lightness line is changed with the obtained color separation data on the mixture ratio of the yellow ink to the light magenta ink which corresponds to the best granularity. Such obtained color separation data allows the yellow and light magenta inks and the particular color ink red to be used in a low saturation part.

17 Claims, 17 Drawing Sheets

METHOD OF GENERATING COLOR SEPARATION DATA AND IMAGE PROCESSING APPARATUS

BACKGROUND OF THE INVENTION

1. Field of the Invention

The present invention relates to a method of generating color separation data and an image processing apparatus, and specifically, to generation of color separation data in the case that printing materials of particular colors are used for a printing apparatus.

2. Description of the Related Art

One of the major factors that affect a print quality in a printing apparatus is granularity of the printed image. It is known that in addition to printing materials which are generally used for printing, low concentration printing materials, whose concentration is lower than that of the generally used printing material, are used. For example, an ink-jet printing apparatus uses, for cyan and magenta inks, in addition to inks having dye or pigment concentration which is generally used, low concentration inks having lower dye or pigment concentration than that of generally used inks. Especially, a low density portion of an image such as a highlight portion of image is printed by using the low concentration inks to reduce granularity of the image.

On the other hand, when enlarging a gamut in a saturation or the like, it has been known that a printing material of particular color, which has a property of high saturation by nature, is used. When using the particular color printing material and making consideration of reducing the granularity of the image, generally, it is possible for the light printing material to be also used for the particular color. However, in this case, apparatus elements such as a printing head for the newly added printing material are additionally required, to cause a negative effect such as increasing the size of the apparatus. In contrast, Japanese Patent Application Laid-open No. 08-085219 (1996) reduces the granularity of an area printed with the particular color printing material without specifically using low concentration printing material of the particular color. More specifically, Japanese Patent Application Laid-open No. 08-085219(1996) uses light cyan and light magenta inks, which are low concentration inks respectively, instead of using particular blue ink, for low density portion in a gamut area which can be reproduced with the particular blue ink, and reduces the granularity in the low density portion.

However, though the particular printing material having high saturation and high lightness is used, a gamut area to be enlarged by nature with the particular printing material is not effectively used in Japanese Patent Application Laid-open No. 08-085219 (1996). More specifically, in the case of using the particular printing material, a gamut area can be enlarged in a L* axis direction, that is, in a lightness direction. However, in Japanese Patent Application Laid-open No. 08-085219 (1996), as shown in FIG. 12 of this document, a low saturation portion designated as hatched portion is reproduced without using the blue ink of the particular color printing material. For this reason, there may occur a problem that a gamut area to be enlarged for lightness of low saturation portion can not be effectively used.

SUMMARY OF THE INVENTION

An object of the present invention is to provide a method of generating color separation data and an image processing apparatus that, if printing is performed with use of a particular color printing material in addition to basic printing material, can reduce granularity in a low density portion without using a low concentration printing material for a particular color, and can effectively use a gamut area which can be enlarged with use of the particular color printing material.

In the first aspect of the present invention, there is provided a color separation data generation method for generating color separation data, which is used for a printing apparatus and corresponds to printing materials of basic colors, a printing material of a light color having lower color material concentration than a basic color, and a printing material of a particular color except the basic color, for a predetermined gamut, wherein the method generates the respective color separation data corresponding to the printing material of the particular color, and respective first and second printing materials which include at least one printing material of light color in respective hues on both sides of a hue in which a particular color is present, at a proportion according to lightness in a gamut.

In the second aspect of the present invention, there is provided an image processing apparatus that generates color separation data, which is used for a printing apparatus and corresponds to printing materials of basic colors, a printing material of a light color having lower color material concentration than a basic color, and a printing material of a particular color except the basic color, for a predetermined gamut, wherein the apparatus generates the respective color separation data corresponding to the printing material of the particular color, and respective first and second printing materials which include at least one printing material of light color in respective hues on both sides of a hue in which a particular color is present, at a proportion according to lightness in a gamut.

With the above configuration, at a proportion according to lightness in a gamut, respective color separation data corresponding to a printing material of a particular color, a first and a second printing materials, which include at least one printing material of light color in hues on both sides of a hue in which a particular color is present, are generated. Thereby, for example, at a gamut area of high lightness in a hue R and hues vicinity of the hue R, the particular color printing material such as Red ink as well as printing materials corresponding to hues on the both sides of hue of the Red ink, that is, Yellow ink and light Magenta ink of the light color printing material, can be used. This enables a gamut area on a lightness and a saturation or the like of the particular color printing material to be effectively sued.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the present invention will be described below in detail with reference to the drawings.

The term "particular colors" as used herein refers broadly to colors different from the hues of yellow, magenta, and cyan which correspond to printing materials of the basic colors. In a narrow sense, in a CIE-L*a*b* color space, a "particular color" is a color that can express a lightness higher than that of a color reproduction area expressed on a print medium using a combination of two of the basic-color printing materials of magenta, yellow, and cyan and which indicates a hue angle in a color reproduction area expressed by the combination of two printing materials. Alternatively, in the CIE-L*a*b color space, the term "particular color" may refer to a color that can express a lightness and/or a saturation higher than those of the color reproduction area expressed on the print medium using a combination of two of the basic-color printing materials of magenta, yellow, and cyan and which indicates the hue angle in the color reproduction area expressed by the combination of two printing materials.

In the present invention, it is preferable to use printing materials of the "particular colors" in the above narrow sense, but printing materials of the "particular colors" in the broad sense may also be used.

(Summary of Print System)

Figure 1:
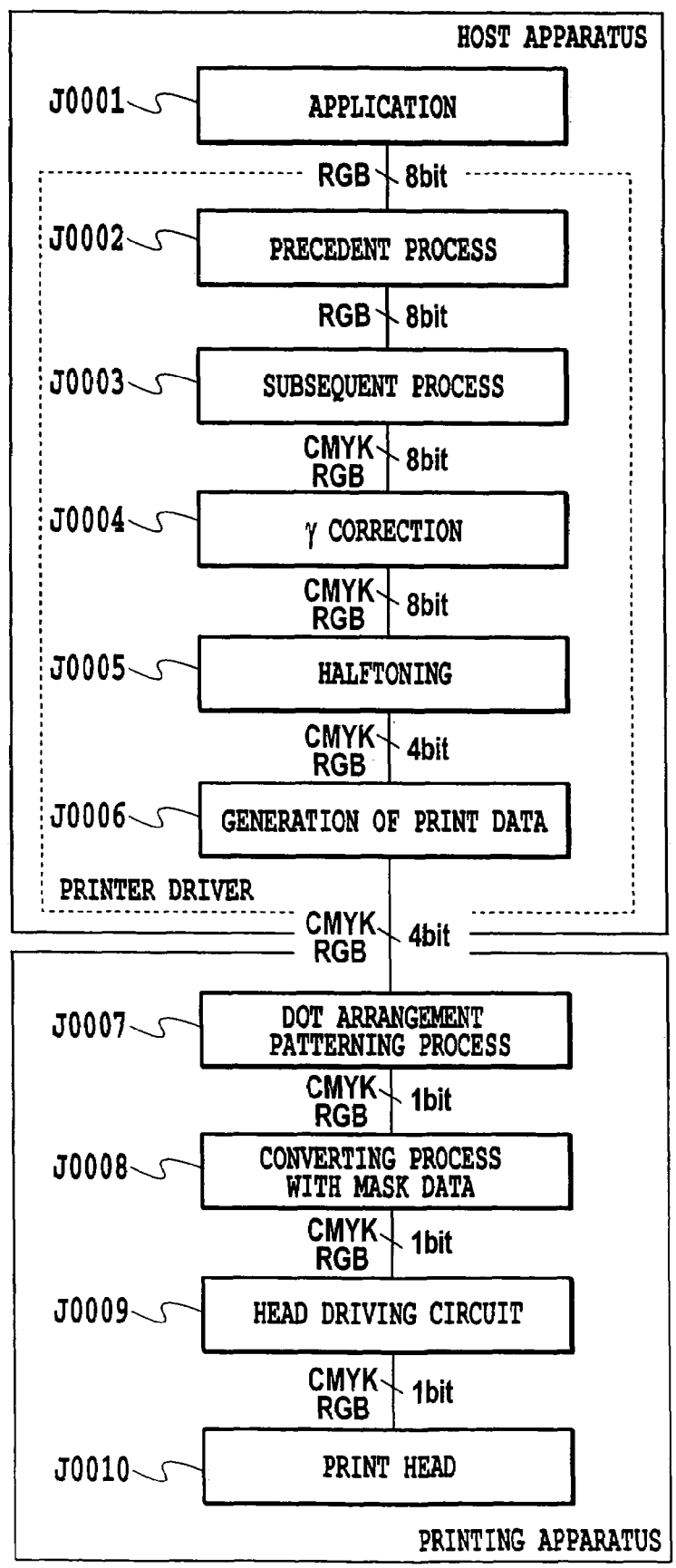
FIG. 1 is a block diagram showing the configuration of a print system according to a first embodiment of the present invention.

FIG. 1 is a block diagram showing the configuration of a print system according to a first embodiment. A printer according to the present embodiment executes printing using light cyan and light magenta inks of low concentration of dye for cyan and magenta respectively, in addition to basic-color inks of cyan, magenta, yellow, and black and particular color inks of red, green, and blue. Thus, the printer uses print heads that eject these seven color inks. As shown in FIG. 1, the print system according to the present embodiment is composed of a printer operating as a printing apparatus using the particular color inks and a personal computer (PC) operating as a host apparatus or an image processing apparatus.

Programs operated by an operating system in the host apparatus include an application and a printer driver. The application J0001 executes a process of creating image data printed by the printer. The image data or data not undergoing editing or the like can be loaded into the PC via various media. The PC according to the present embodiment can use a CF card to load image data in, for example, a JPEG format which has been photographed using a digital camera. The PC can also load image data in, for example, a TIFF format which has been read using a scanner and image data stored in a CD-ROM. The loaded data is displayed on a monitor of the PC and is then, for example, edited or processed via the application J0001 to create image data R, G, and B in conformity with, for example, an sRGB standard. Then, in response to a print instruction, the image data is passed to the printer driver.

The printer driver according to the present embodiment has processes including a precedent process J0002, a subsequent process J0003, γ correction J0004, half toning J0005, and print data creation J0006. The precedent process J0002 performs mapping of a gamut. The precedent process J0002 according to the present embodiment uses a three-dimensional LUT containing the mapping relationship for mapping a gamut reproduced by image data R, G, and B in conformity with the sRGB standard into a gamut reproduced by the printer of the present print system and also uses an interpolation operation to convert 8-bit image data R, G, and B into data R, G, and B in the gamut of the printer. On the basis of the data R, G, and B having undergone the above described gamut mapping, the subsequent process J0003, as described later in detail, executes a process of determining color separation data Y, M, C, K, R, Lc, and Lm corresponding to a combination of inks that reproduces colors indicated by the data. In the present embodiment, this process uses both three-dimensional LUT and interpolation operation similarly to the precedent process. The γ correction J0004 performs a converting operation on the gradation value of data on each color of the color separation data determined by the subsequent process J0003. Specifically, a one-dimensional LUT corresponding to the gradation characteristic of each color ink for the printer used in the present system is used to execute a conversion such that the color separation data is linearly associated with the gradation characteristic of the printer. The half toning J0005 executes quantization in which each of the 8-bit color separation data Y, M, C, K, R, Lc, and Lm is converted into 4-bit data. In the present embodiment, an error diffusion method is used to convert 8-bit data into 4-bit data. The 4-bit data is used as indices indicating an arrangement pattern for a patterning process for a dot arrangement in the printing apparatus. Finally, the print data creation process J0006 creates print data composed print image data containing the 4-bit index data as well as print control information. The above-described processes of the application and printer driver are executed by a CPU in accordance with corresponding programs. In this case, the programs are read from a ROM or a hard disk. A RAM is used as a work area in executing the processes.

The printing apparatus executes a dot arrangement patterning process J0007 and a mask data converting process J0008 in connection with data processing. The dot arrangement patterning process J0007 arranges dots in accordance with a dot arrangement pattern corresponding to the 4-bit index data (gradation value information), the print image data, for each pixel corresponding to an actual print image. In this manner, a dot arrangement pattern is assigned to each pixel expressed by the 4-bit data; the dot arrangement pattern corresponds to the gradation value of the pixel. This defines a dot to be turned on or off for each of the plurality of areas in the pixel. Then, ejection data "1" or "0" is placed in each area in one pixel. One-bit ejection data thus obtained is subjected by the mask data conversion process J0008 to a mask process. Specifically, ejection data for each scan required to print a scanning area of a predetermined width is generated with a process using a mask corresponding to each scan. The ejection data Y, M, C, L, R, Lc, and Lm for each scan is transmitted to a head driving circuit at appropriate times. Thus, a print head J0001 is driven to eject the respective inks in accordance with the ejection data. The dot arrangement patterning process and mask data converting process in the printing apparatus are executed under a CPU constituting a control section of the printing apparatus, using exclusive hardware circuits. These processes may be executed by the CPU in accordance with the programs or by, for example, the printer driver in the PC. That is, any processing form may be used in applying the present invention as is apparent from the description below.

The above described printer according to the present embodiment uses red as particular color inks. This particular color ink can preferably express a higher saturation and lightness than secondary colors of the same hues produced by mixing two of the basic color inks of yellow, and magenta. However, the present invention is not limited to this aspect. The inks have only to be able to express a lightness higher than at least the secondary colors. That is, the particular color that can be suitably used in the present embodiment refers to a color that has, in the CIE-L*a*b color space, a lightness higher than that of the color reproduction area expressed on the print medium using a combination of two of the basic-color printing materials of magenta, yellow, and cyan and which indicates the hue angle in the color reproduction area expressed by the combination of two printing materials. The particular color can preferably express a saturation higher than that of the above stated color reproduction area.

The particular color ink red according to the present embodiment can express a saturation and a lightness higher than those of a color space that can be reproduced by input image data R, G, and B in conformity with the sRGB standard for monitors and the like. In the present embodiment, the printer, using the inks as printing materials, will be described. However, the description is also valid for a printer or a copy machine using other printing materials such as toners except for descriptions inherent in the inks, as is also apparent from the following description.

In the present specification, the inks as printing materials will be expressed using English, cyan, magenta, yellow, black, red, light cyan and light magenta. The color or its data or hue will be denoted as one English capital letter such as C, M, Y, K, R, Lc and Lm or a combination of one English capital letter and one English small letter. Specifically, "C" denotes a cyan color or its data or hue, "M" denotes a magenta color or its data or hue, and "Y" denotes a yellow color or its data or hue. "K" denotes a black color or its data or hue, and "R" denotes a red color or its data or hue. "Lc" denotes a light cyan color or its data or hue, and "Lm" denotes a light magenta color or its data or hue.

Moreover, in the present specification, the term "pixel" refers to a minimum unit that can be expressed using gradations or a minimum unit to be subjected to image processing of multi-valued data of multiple bits (the precedent process, subsequent process, γ correction, half toning, and the like, which are mentioned above). In a dot arrangement patterning process, one pixel corresponds to a pattern of 2×4 frames. Each frame in one pixel is defined as an area. The "area" is a minimum unit for which each dot is turned on or off. In connection with this, the "image data" in the precedent process, subsequent process, or γ correction represents a set of pixels to be processed. Each pixel is data containing an 8-bit gradation value. The "image data" in half toning represents image data itself to be processed. In the half toning according to the present embodiment, image data containing the 8-bit gradation value is converted into image data (index data) containing 4-bit gradation values.

(Subsequent Process)

The subsequent process according to the present embodiment reads lattice point data using an LUT and carries out an interpolation process on the basis of the lattice point data to convert input data R, G, and B to generate color separation data C, M, Y, K, R, Lc, and Lm, as previously described in FIG. 1. The LUT, the concept of which is shown in FIG. 17, stores the color separation data as lattice point data for the LUT in order to realize gradation values, described later, or a gamut. That is, the conversion relationship indicated by the LUT represents the contents of the implementation of the method of generating color separation data according to the present embodiment. However, of course, the implementation of the method of generating color separation data is not limited to such a form as uses an LUT. For example, a mathematic operation based on an equation expressing the above conversion relationship is performed on the input data R, G, and B to obtain color separation data.

Figure 2:
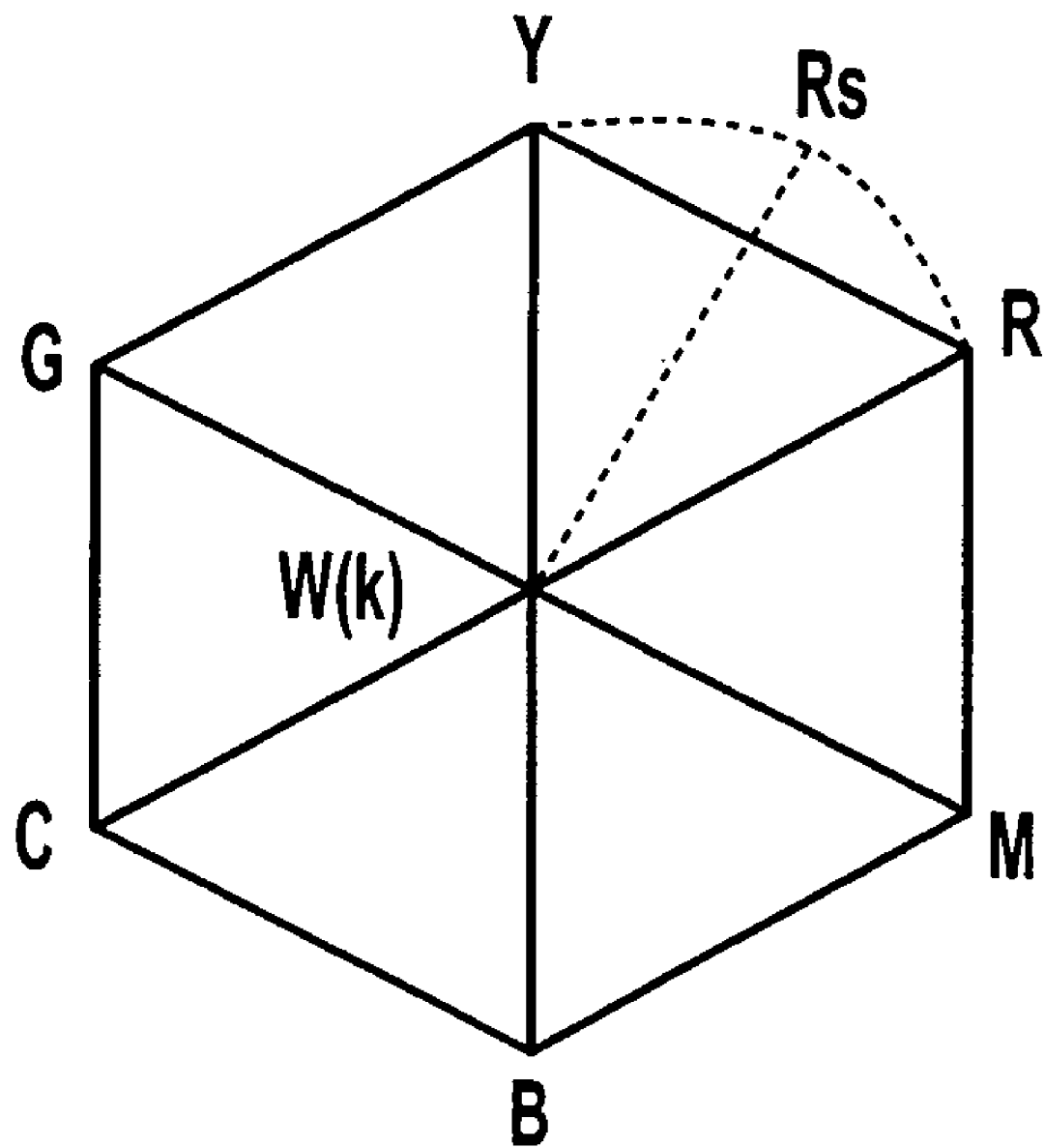
FIG. 2 is a diagram showing a gamut reproduced by the whole color separation data according to the first embodiment.

FIG. 2 is a diagram schematically showing a gamut reproduced by the whole color separation data according to the present embodiment. This figure represents an a*b* plane in the CIEL*a*b* space.

In this figure, the hexagon shown by a solid line shows a gamut that can be expressed using the basic color inks cyan, yellow, magenta, and black, which are used in the present embodiment. A broken line shows an enlarged gamut that can be expressed using the particular color inks red according to the present embodiment in addition to the basic color inks. In this gamut, hue Rs belongs to the particular color ink red. This clearly indicates that the particular color inks according to the present embodiment are selected so that the hue Rs is present between the hues Y and R. Further, the particular color inks red used in the present embodiment can realize a gamut with a higher lightness and saturation than colors of the same hues realized by an ink system which does not use these particular color inks but which includes the basic color inks yellow, magenta, and cyan, with black added as required. In the specification, the expression that a particular color printing material has a "high saturation" and a "high lightness" is used in the above meaning unless otherwise specified. Such a high saturation and lightness enables the reproduction of a gamut larger than that provided by the above ink system. Description will be given of two features, how the particular color ink red according to the embodiment of the present invention is used, that is, how color separation data R corresponding to the red ink is set for the lattice points of the LUT and how the resulting gamut is enlarged.

In the subsequent process according to the present embodiment, further specifically, since the printer uses the basic color inks cyan, magenta, yellow and the particular color ink red, as well as the light cyan and light magenta inks, having a lower dye concentration than the cyan and magenta inks, respectively, color separation data is generated including color separation data Lc and Lm on these light color inks. A content of color separation table (LUT) according to the present embodiment which is used in this case is added to the above described subsequent process according to the first embodiment and is characterized as described below.

Figure 3A:
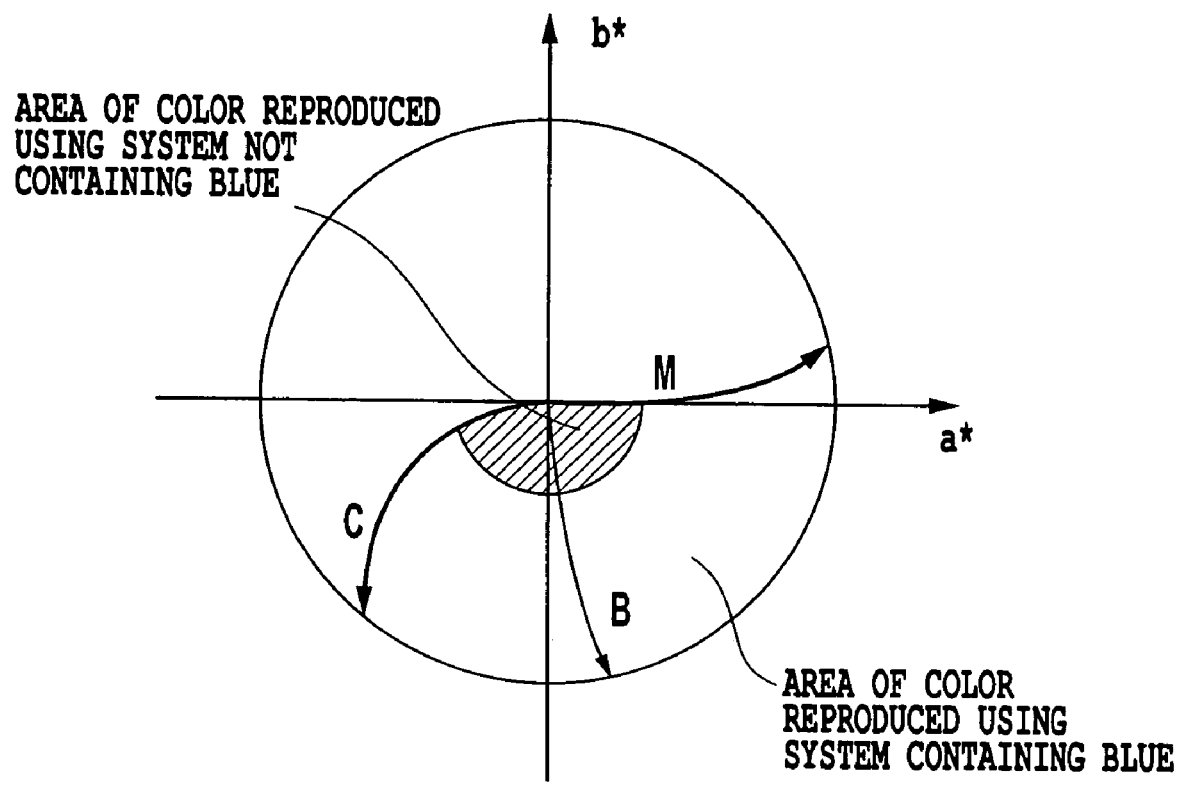
FIG. 3A is a graph showing that a low-saturation part of a particular hue is reproduced without using any particular color inks and FIG. 3B is a graph illustrating that the gamut of the low-saturation area otherwise enlarged by a particular color material cannot be effectively utilized.
Figure 3B:
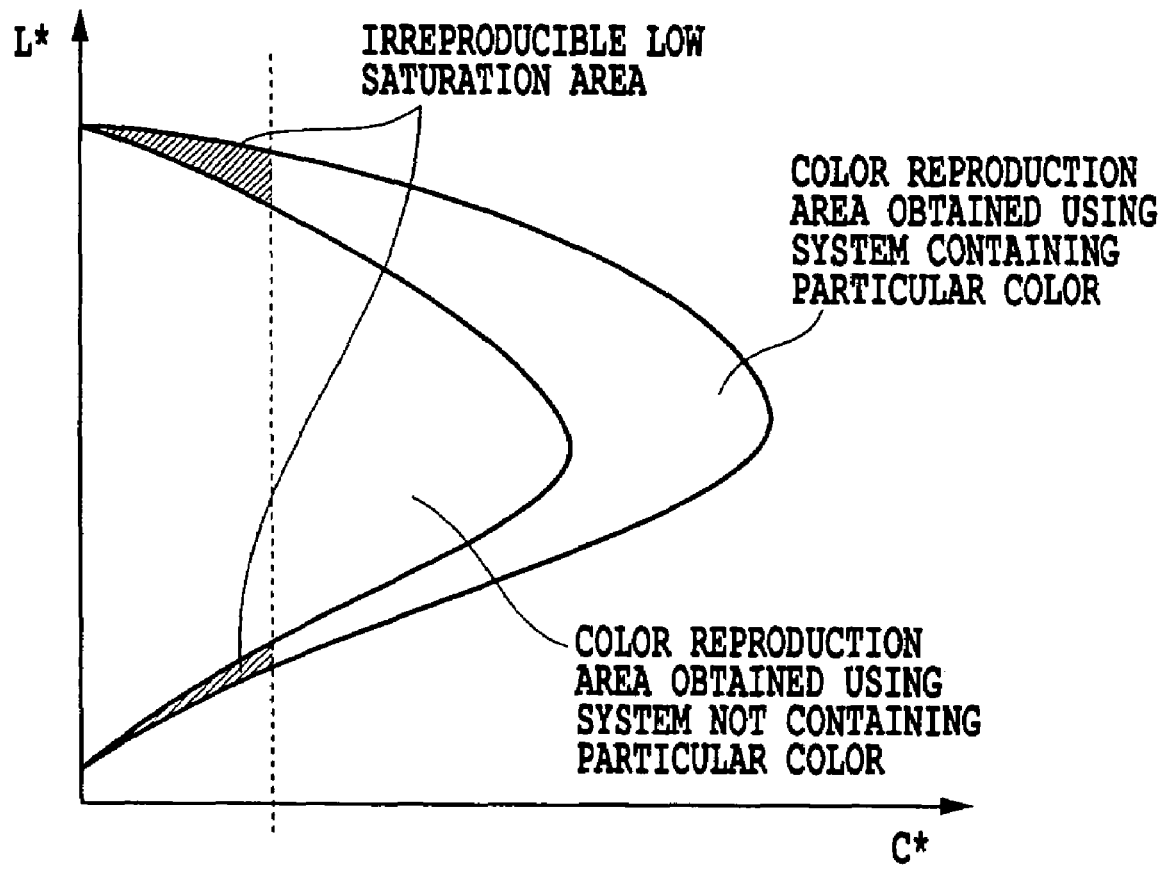

The conventional technique shown in Japanese Patent Application Laid-open No. 08-085219 (1996) reproduces a low saturation part that is shaded as shown in FIG. 3A, without using the blue ink of the particular color material. A problem with this technique is that the gamut otherwise enlarged by the particular color material cannot be effectively utilized as shown in the shaded part in FIG. 3B. In contrast, the present embodiment uses such a color separation table as uses, for a low-saturation part shown in FIG. 3A of a hue that can be expressed by a particular color material, not only a low concentration color material that can express the color of the hue but also the above particular color material. This makes it possible to make effective use of the gamut that can be enlarged by the particular color and to weaken a granular impression.

Figure 4:
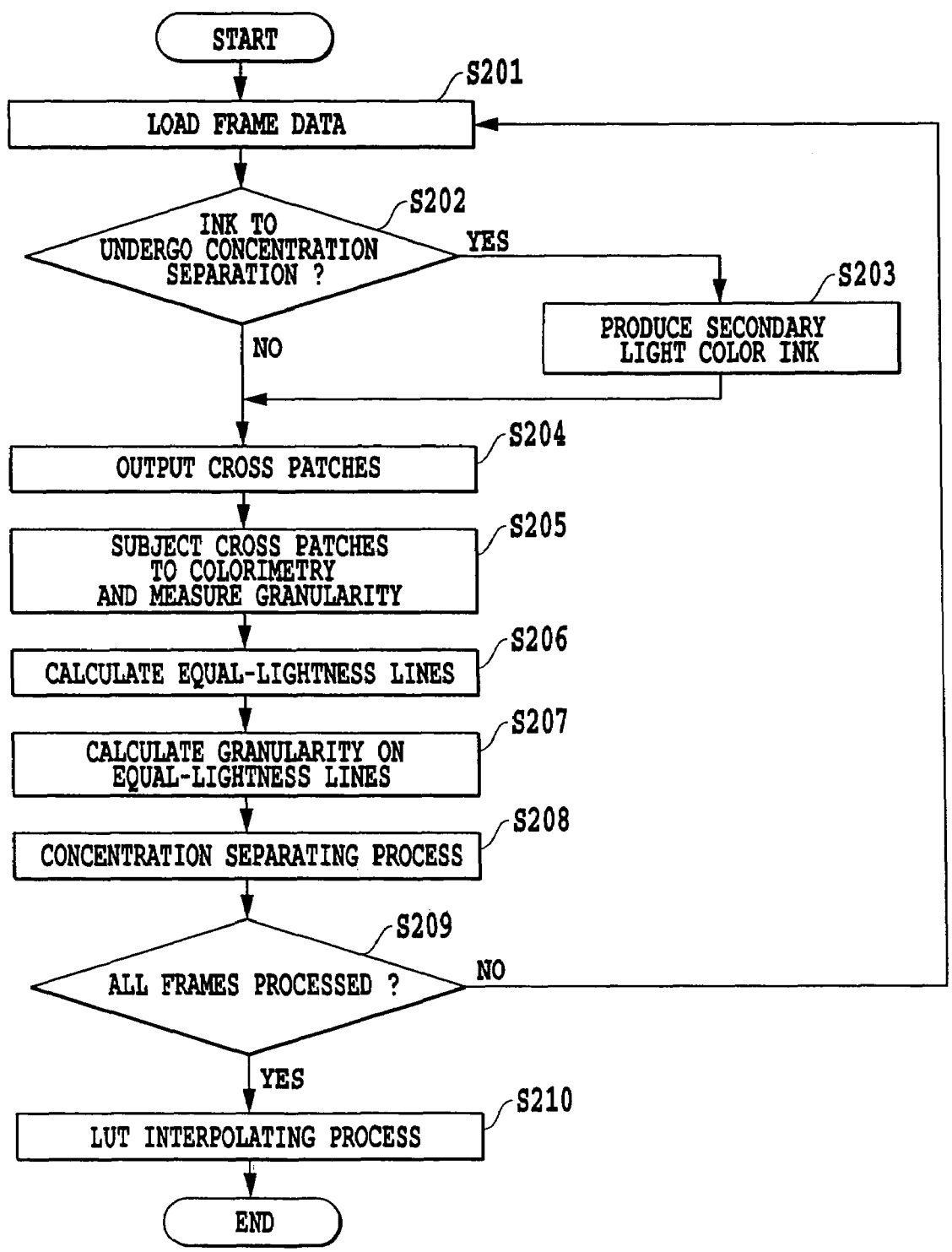
FIG. 4 is a flow chart showing a process of creating an LUT that generates color separation data containing those on light cyan and light magenta, according to the second embodiment of the present invention.

FIG. 4 is a flow chart showing a process of creating an LUT that generates color separation data including data Lc and Lm on light cyan and light magenta, respectively.

Figure 5A:
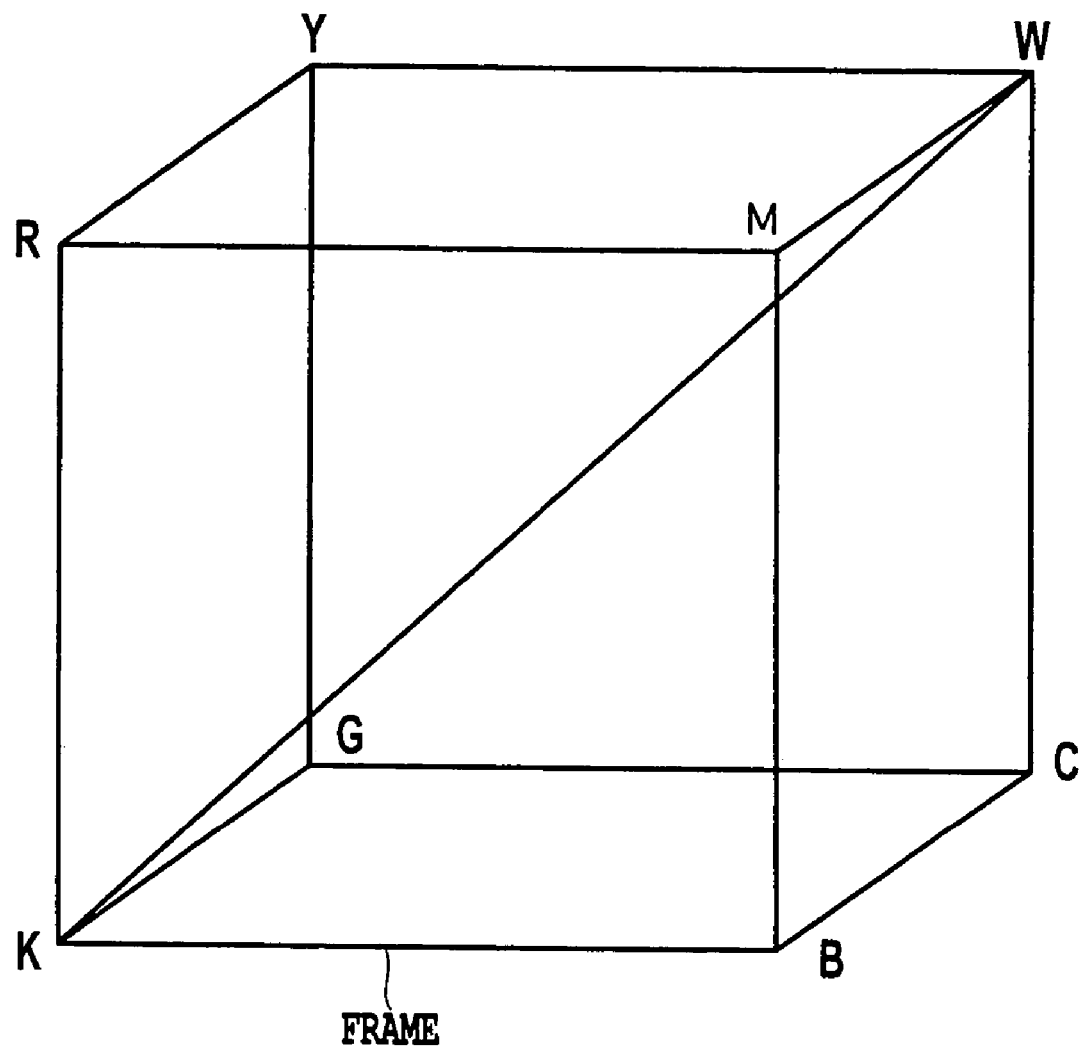
FIG. 5A is a diagram illustrating frame data used for the LUT creating process.
Figure 5B:
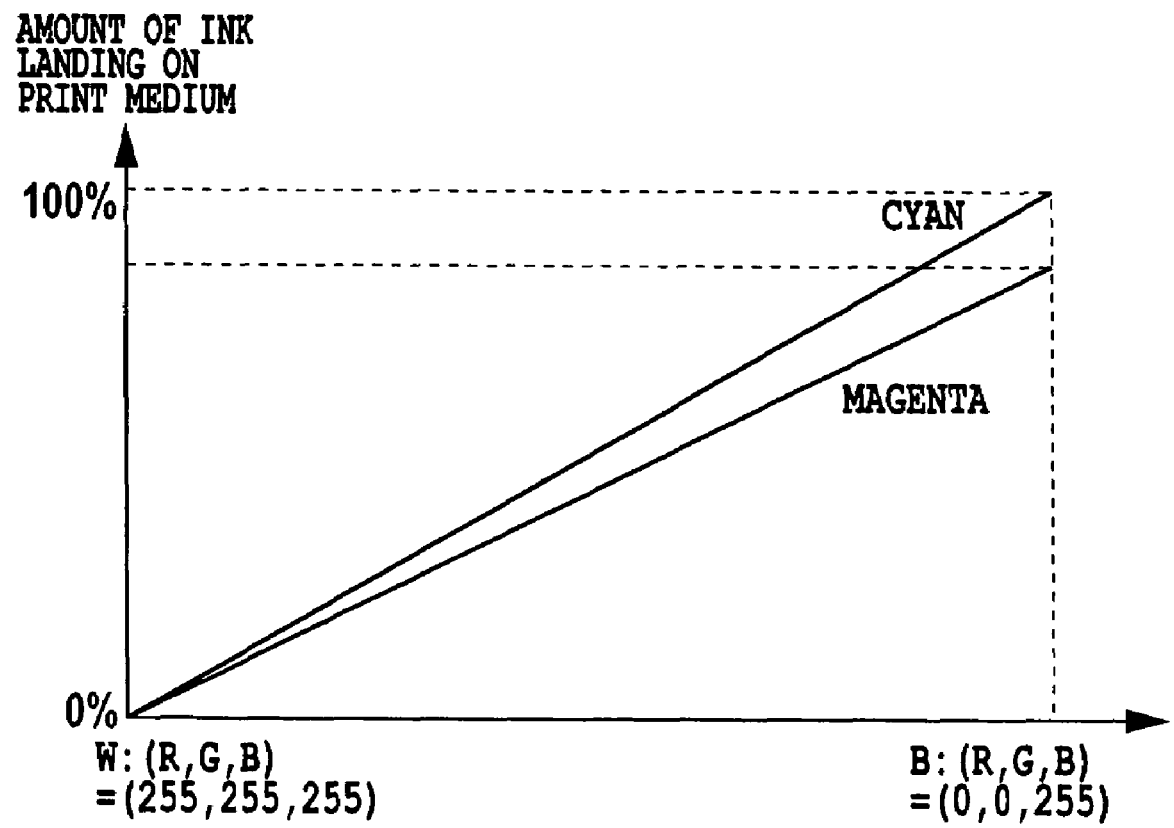
FIG. 5B is a graph showing data on one frame.

First, in a step S201, frame data is loaded which is stored in a predetermined memory and which has not undergone concentration separation yet. Specifically, an LUT is created which generates color separation data Y, M, C, K, and R not including those on light cyan and light magenta. Then, the frame data from the LUT is loaded. The frame data refers to lattice point data, that is, color separation data wherein when the entire LUT is conceptually expressed as a cubic lattice such as the one shown in FIG. 5A, lattice points are present on the sides or diagonals (frames: W-R, W-G, . . . , Y-K, . . . , W-K, and so on) of the cubic lattice. For example, the color separation data on the frame W-B is as shown in FIG. 5B. Of course, the LUT from which the frame data is read need not contain lattice point data on all the lattice points including those inside the cubic lattice shown in FIG. 5A but may contain lattice point data on at least predetermined frames.

Then, in step S202, it is determined whether or not there is color separation data R on the particular color ink red, which is to undergo concentration separation. If there is the color separation data R, the process proceeds to step S203. Otherwise, the process proceeds to step S204.

Figure 6:
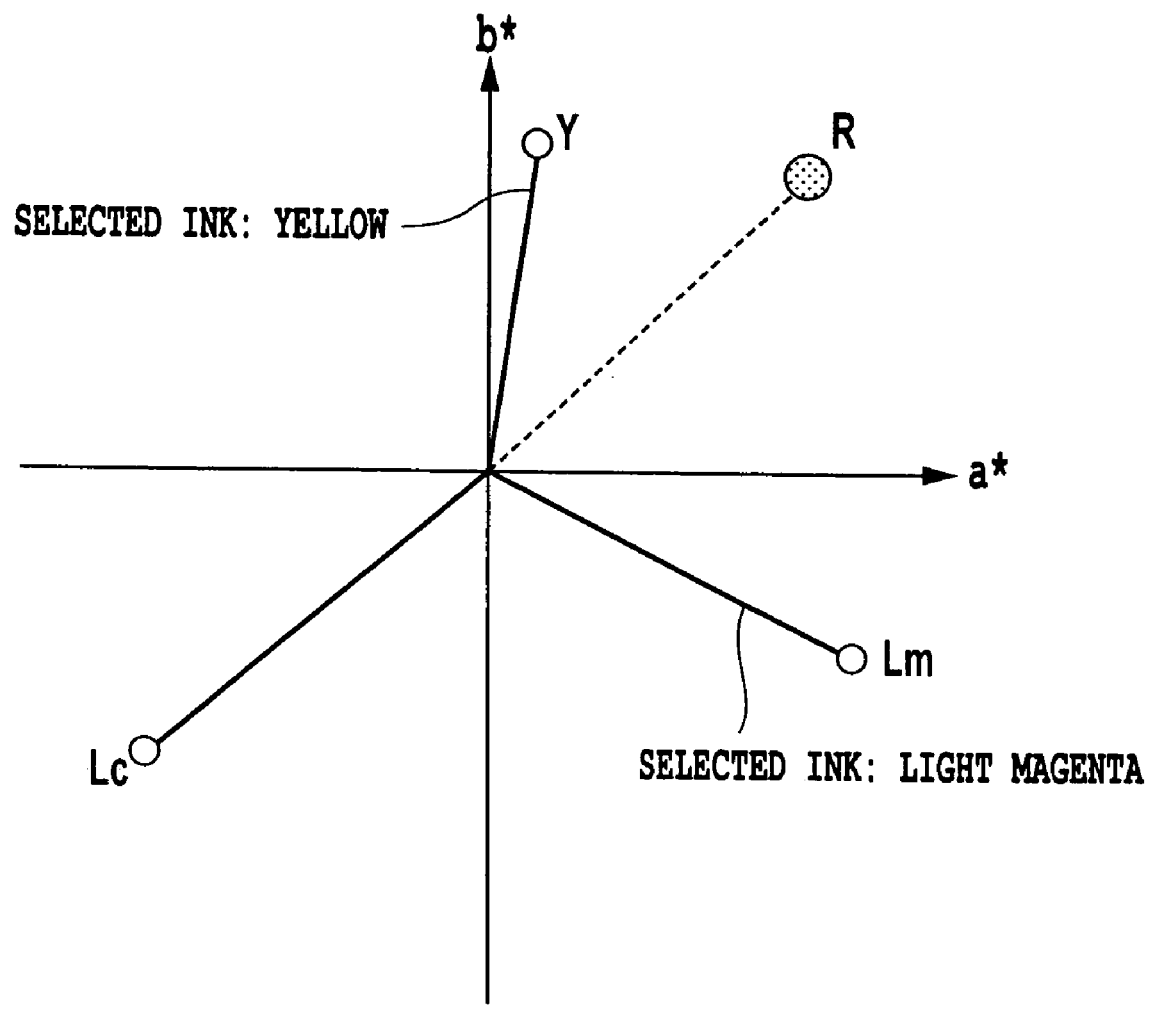
FIG. 6 is a graph illustrating a part of the LUT creating process in which color separation data on the particular color ink Red is partly separated into color separation data on a yellow and light magenta inks having light colors (low dye concentrations)
Figure 7A:
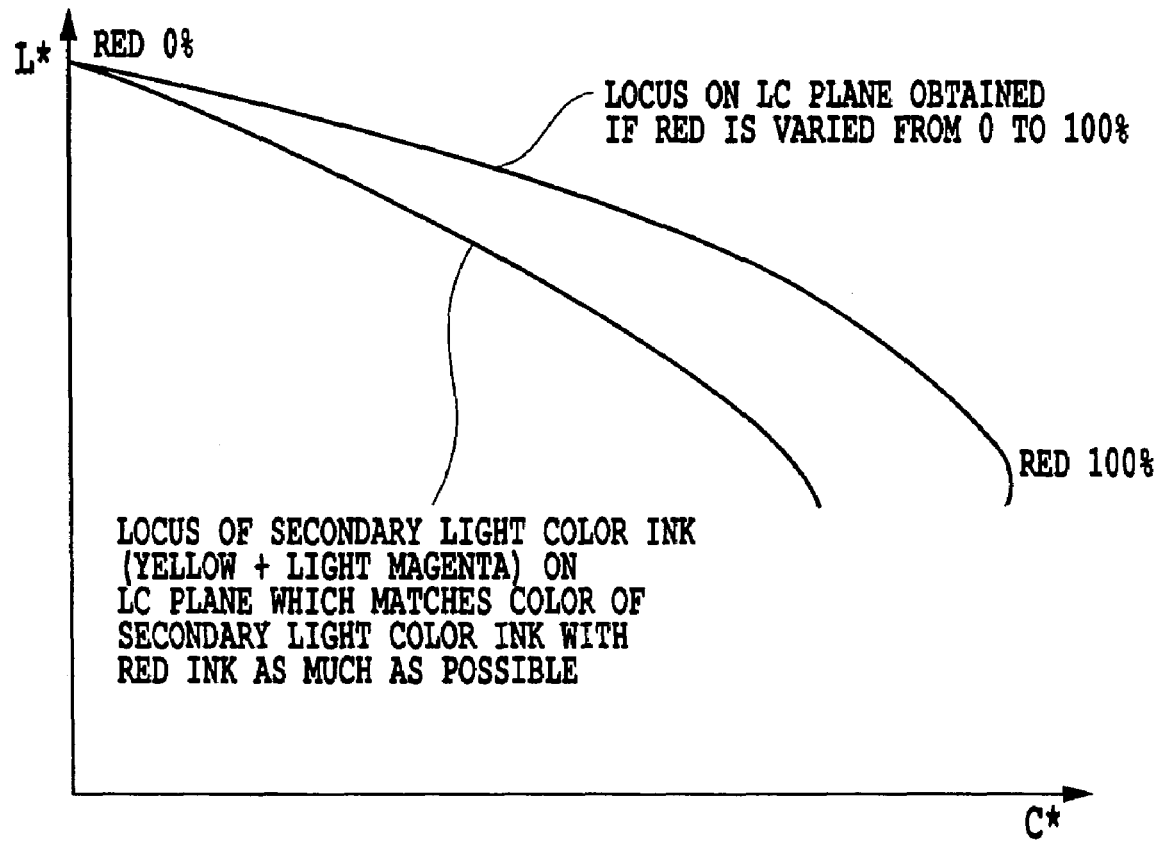
FIG. 7A is a graph illustrating a process of color matching to the particular color ink Red in the color separation.
Figure 7B:
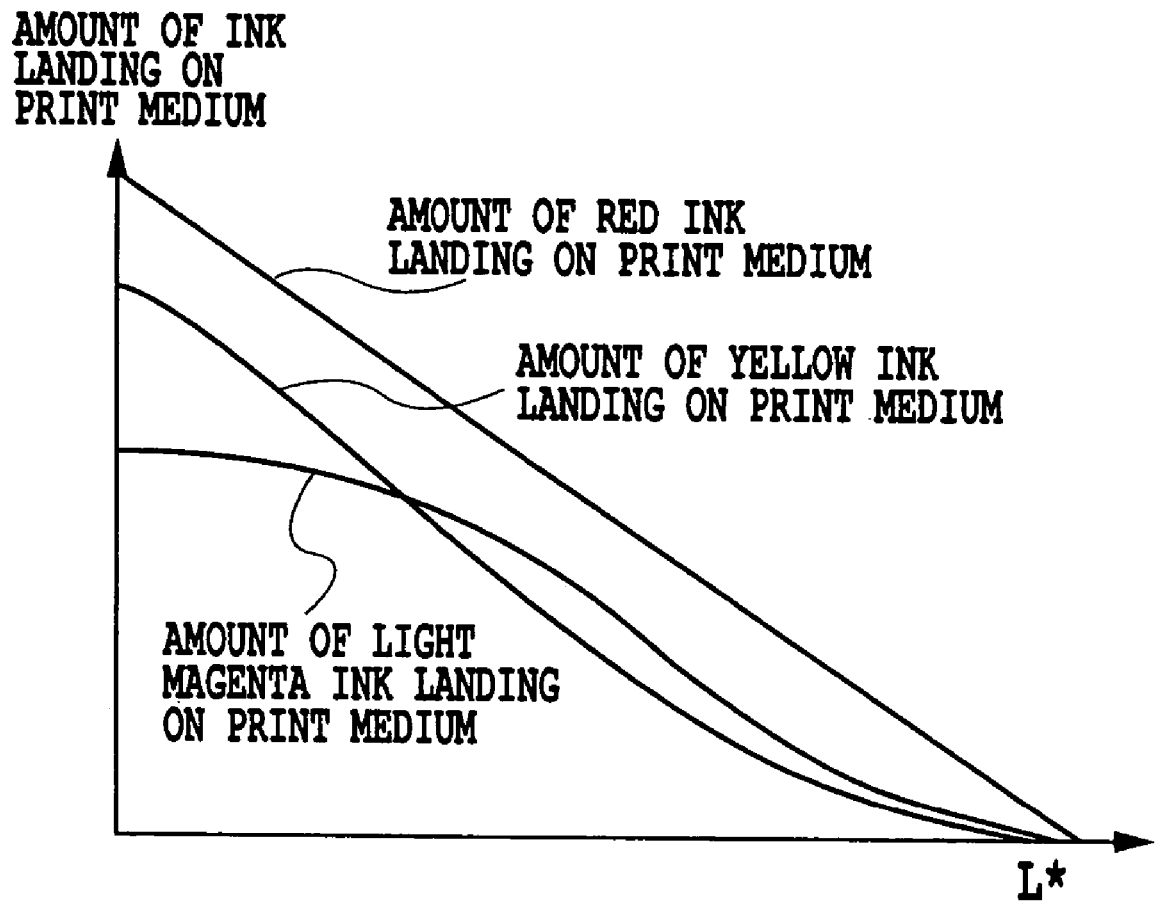
FIG. 7B is a graph showing the results of the color matching.

In step S203, the yellow, light-magenta, and red inks are used to create patch data required to obtain color separation data on these inks in order to express the color separation data R. Specifically, as shown in FIG. 6, the color separation data on the particular color ink red is separated into color separation data on yellow and light magenta inks, which are light color (low dye concentration) inks corresponding to the hues Y and Lm, between which the hue R of the particular color ink red is sandwiched. Then, patch data is created which is expressed by the above color separation data and the color separation data on the red ink. Then, patches are outputted on the basis of the patch data (step S204) and then subjected to colorimetry. On the basis of the results of the colorimetry, the process shown in steps S205 to 207 is executed to subject the color separation data to concentration separation to obtain the final color separation data on the yellow and light magenta inks. As shown in FIG. 7A, in this color separation data, the rate of the secondary color light ink (FIG. 7B) is such that the resulting color matches the particular color ink red as much as possible.

Figure 8:
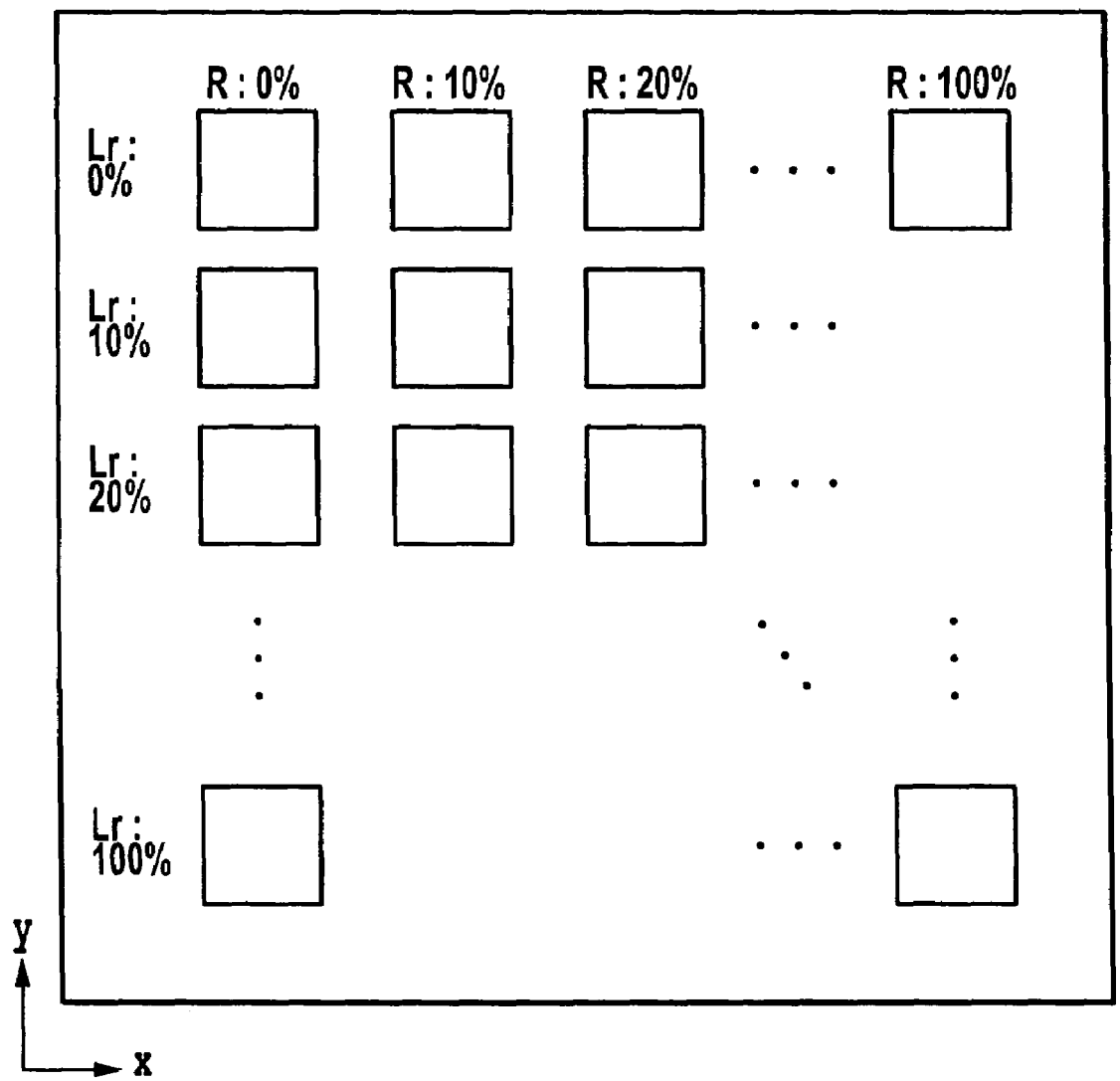
FIG. 8 is a diagram showing patch data generated during the LUT creation on the basis of the relationship between the red ink and a secondary light color ink.

Patches output in step S204 are based on the patch data created in step S203 as described above or on the patch data of the frame data per se. The patch data is created and outputted for each of the frames for the color separation data R or other color separation data for which the concentration separation is executed. Only the concentration separation process for the color separation data R is described below. As shown in FIG. 8, cross patch data is generated and outputted in which the amount of red ink landed R varies in the x direction at a fixed rate, while the amount of secondary light color ink, that is, yellow and light magenta inks landed Lr=Y+Lm varies in the y direction at a fixed rate.

Figure 9A:
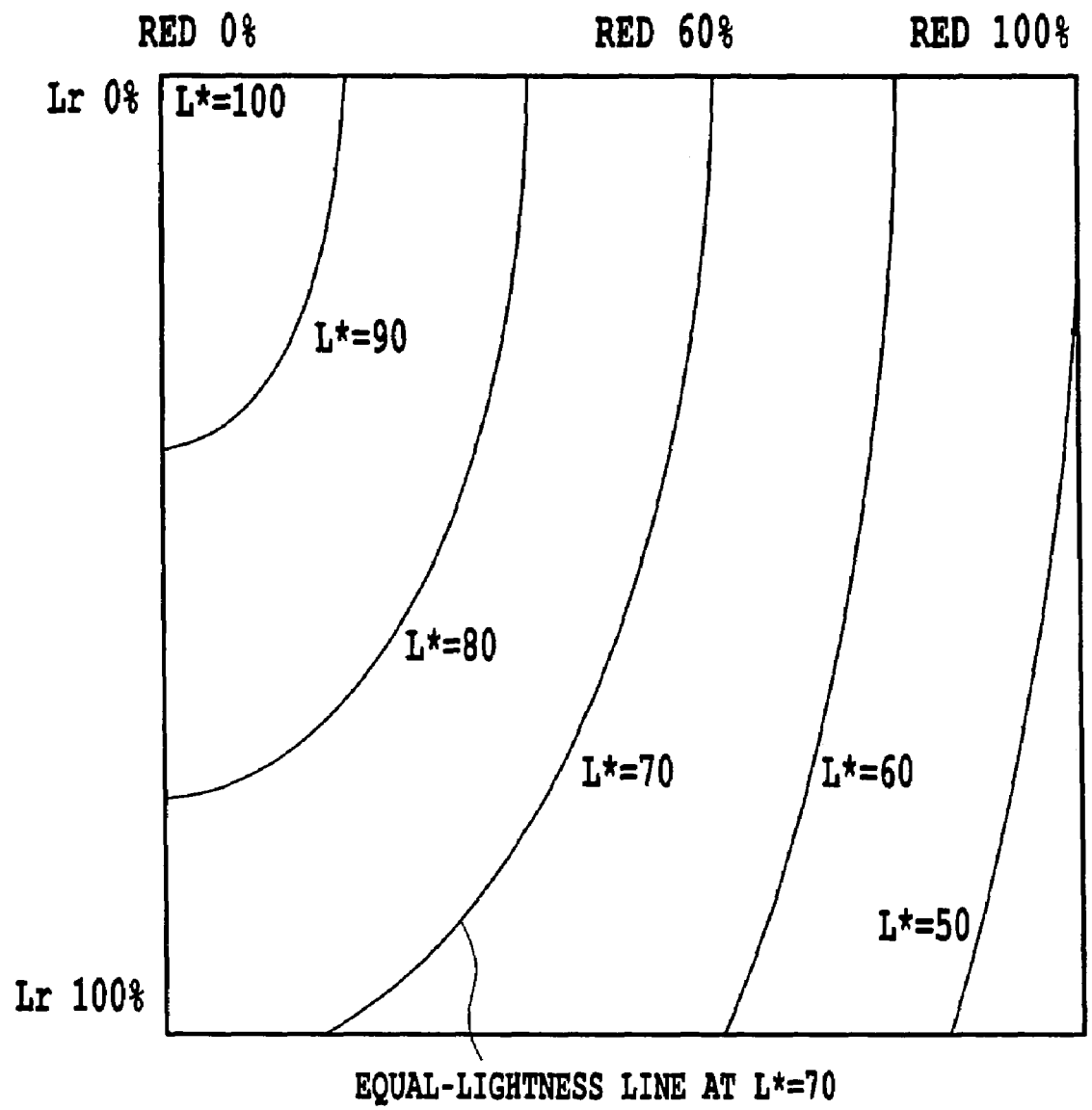
FIG. 9A is a diagram showing equal-lightness lines of the patches subjected to colorimetry in the LUT creating process.
Figure 9B:
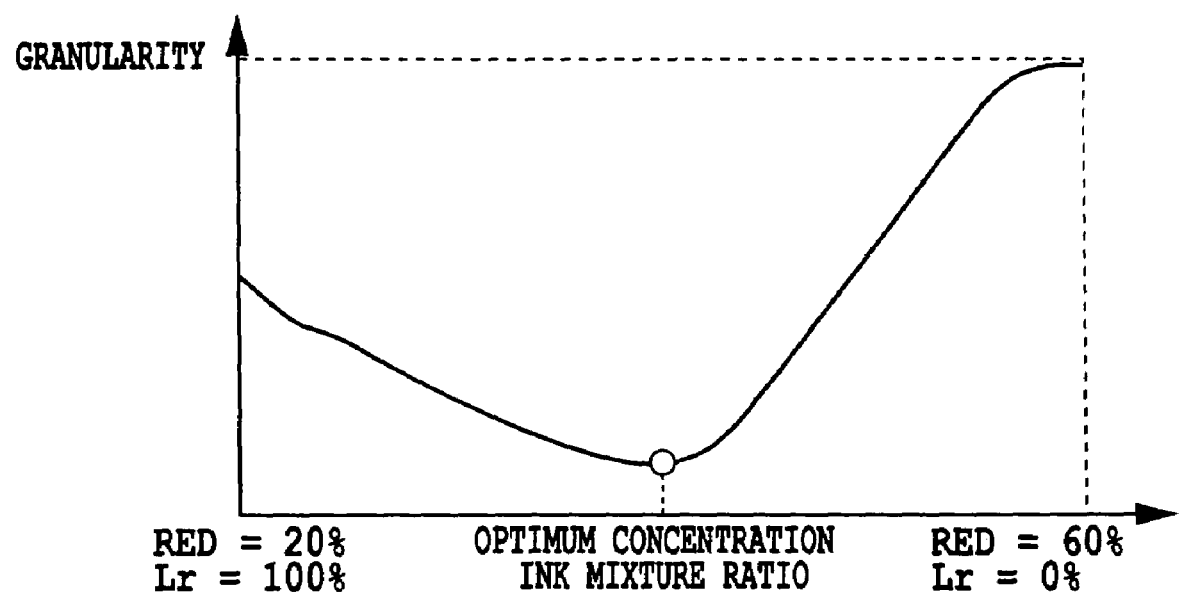
FIG. 9B is a graph illustrating the calculation of granularity for each equal-lightness line.

Then, in step S205, the cross patches are subjected to colorimetry. Further, the granularity of the cross patches is measured in terms of, for example, RMS granularity. Then, in step S206, the cross patch calorimetric information obtained in step S205 is used to calculate an equal-lightness line (the line joining (data on) patches of an equal lightness together) for the patch as shown in FIG. 9A. Moreover, in step S207, as shown in FIG. 9B, the granularity is calculated for each equal-lightness line obtained above. Specifically, FIG. 9B shows an equal-lightness line with a lightness $L^*$ of 70, shown in FIG. 9A. For each of such equal-lightness lines, color separation data is obtained which relates to the mixture ratio of the yellow ink to the light magenta ink corresponding to the best granularity (most insignificant granular impression). Then, in step S208, data on lattice points corresponding to the equal-lightness line is changed with the obtained color separation data on the mixture ratio of the yellow ink to the light magenta ink which corresponds to the best granularity, for an update. Such obtaining of color separation data allows the yellow and light magenta inks and the particular color ink red to be used in a low saturation part of R similar to the gamut represented by the shaded part in FIG. 12 in the above publication. This in turn enables the effective utilization of the gamut enlarged by the particular color ink.

In step S209, it is determined whether or not the concentration separation process has been finished on all the frames. If the concentration separation has been finished on all the frames, the process proceeds to step S210. Otherwise, the process returns to step S201 to execute concentration separation process on the unprocessed frames. In step S210, the lattice point data on the frames undergoing the density separation is interpolated to create an LUT containing the data obtained after the density separation.

As described above, according to the present embodiment, the particular color ink is used to effectively enlarge the gamut. Furthermore, if the particular color ink is used in addition to the basic color inks, it is possible to create such a color separation LUT as weakens the granular impression of a highlight part without using a light color ink corresponding to the particular color ink. Further, since the particular color is used all over the gamut, it is possible to avoid the false contour problem resulting from a variation in the combination of inks used at the boundary between a part with the particular color ink and a part without the particular color ink as described in the above publication.

In the above description, the case of using red ink as the particular color ink is described. However, the particular color is not limited to this. For example, printing materials of blue and green may be used respectively In these cases, when the particular color printing material blue or green is used for a highlight portion, light magenta and light cyan or light cyan and yellow, which colors are in hues on both side of a hue corresponding to the particular color, are of course used according to a granularity.

(Configuration of Mechanism Section)

Description will be given of the configuration of a mechanism section of the printing apparatus applied according to the present embodiment. The printing apparatus main body according to the present embodiment can be classified into a paper feeding section, a paper conveying section, a paper discharging section, a carriage section, a cleaning section, and an armoring section on the basis of the role of each mechanism. Each of these sections will be described below in brief.

Figure 10:
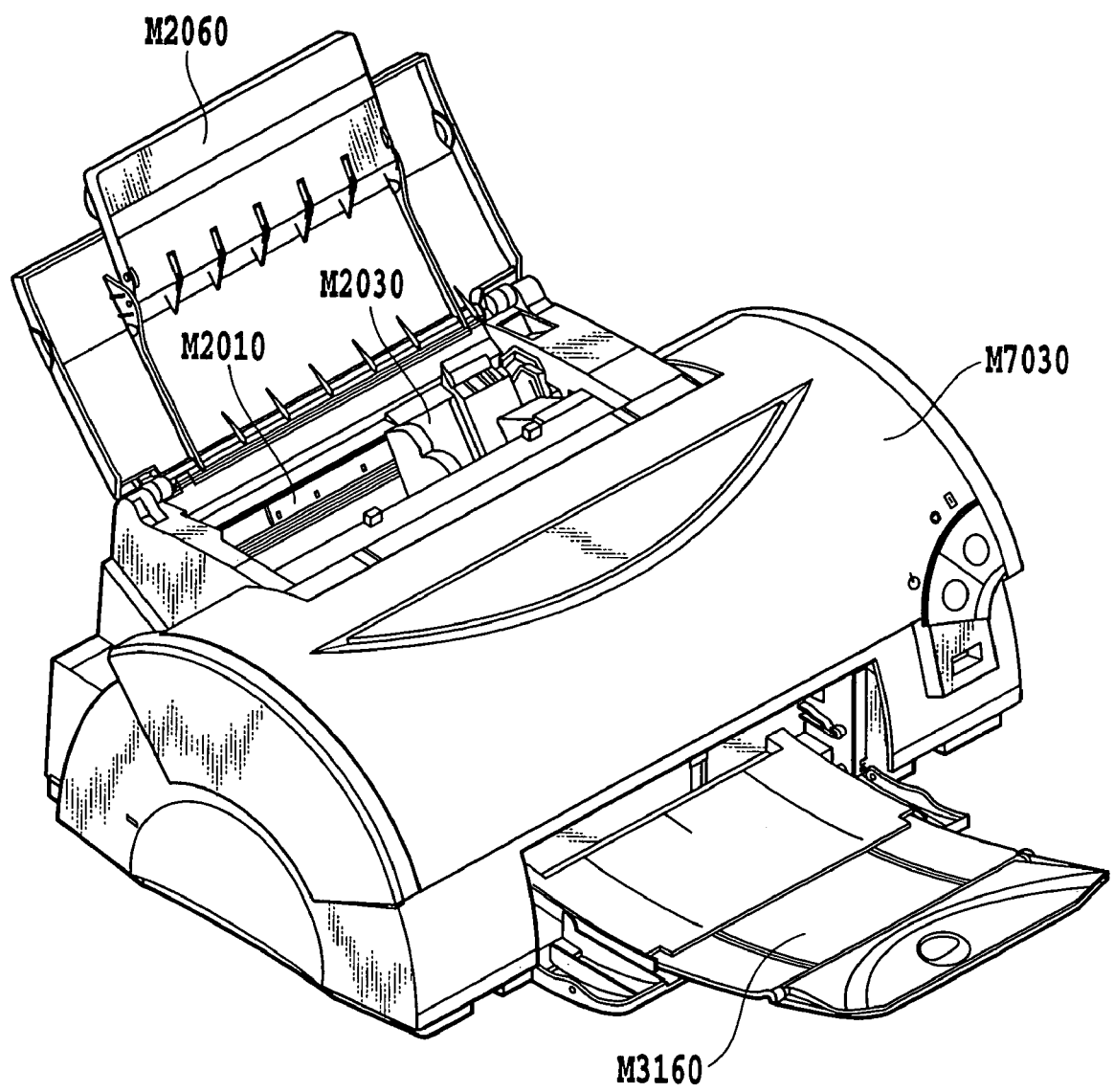
FIG. 10 is a perspective view of the printing apparatus according to the embodiment of the present invention.
Figure 11:
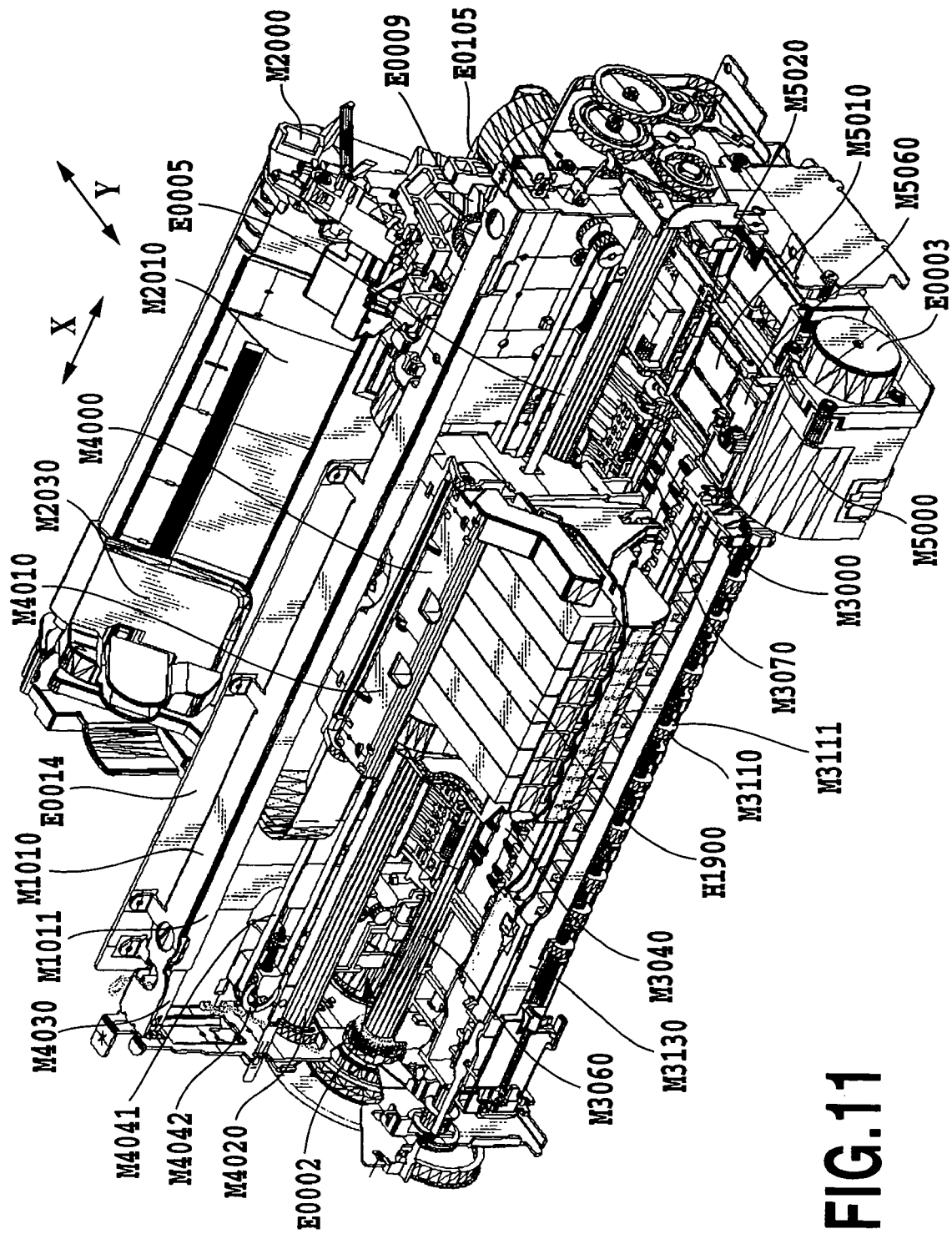
FIG. 11 is a perspective view of a mechanism section of the printing apparatus according to the embodiment of the present invention.
Figure 12:
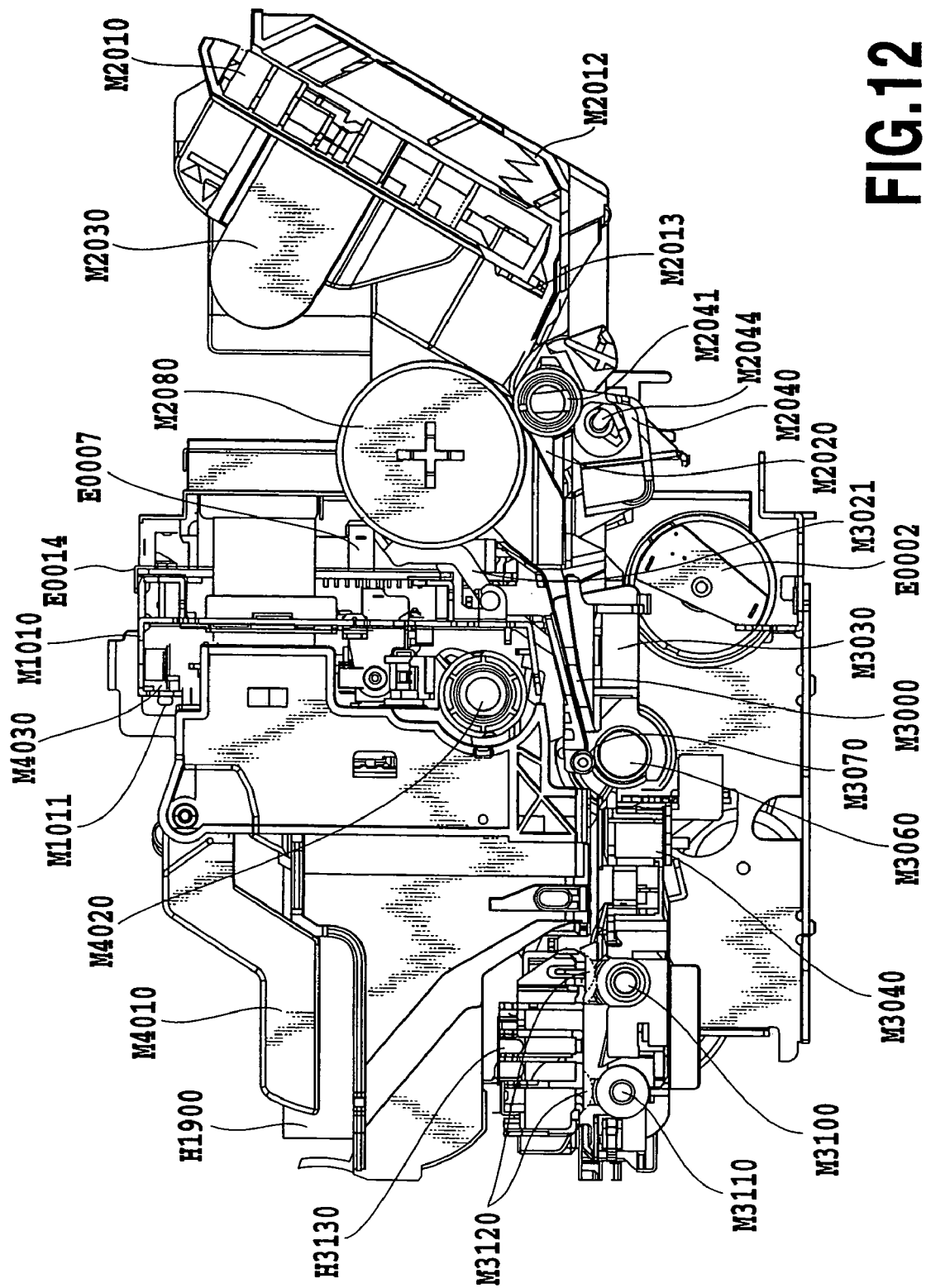
FIG. 12 is a sectional view of the printing apparatus according to the embodiment of the present invention.

FIG. 10 is perspective view of a printing apparatus applied according to the present embodiment. FIGS. 11 and 12 illustrate the internal mechanism of the printing apparatus main body. FIG. 11 is a perspective view of the printing apparatus as viewed from above and the right. FIG. 12 is a side sectional view of the printing apparatus main body.

When paper is fed, in a paper supply section including a supply tray M2060, only a predetermined number of print media are transferred to a nip section composed of the paper feeding roller M2080 and the separating roller M2041. The nip section separates only the upper-most print medium from the other transferred print media and conveys it. A print medium transferred to the paper feeding section is guided by the pinch roller holder M3000 and the paper guide flapper M3030 to the roller pair composed of the conveying roller M3060 and pinch roller M3070. The roller pair composed of the conveying roller M3060 and pinch roller M3070 is drivingly rotated by an LF motor E0002 to convey the print medium on the platen M3040.

If an image is formed on a print medium, the carriage section moves the carriage to locate the print head H1001 at a desired image forming position. The positioned print head H1001 ejects inks to the print medium in accordance with a signal from the electric circuit board E0014. The configuration of the print head H1001 and the printing system will be described later in detail. The printing apparatus according to the present embodiment forms an image on the print medium by alternatively repeating a printing main scan in which the carriage M4000 is scanned in the column direction while printing is being executed using the print head H1001, and a subscan in which the conveying roller M3060 conveys the print medium in the row direction.

Finally, the print medium on which an image has been formed is sandwiched between the first paper discharging roller M3110 and the spurs M3120 and is then conveyed and discharged to a paper discharging tray M3160.

In the cleaning section, When the pump M5000 is operated with a cap M5010 in tight contact with the ink ejection openings in the print head H1001, unwanted ink and the like are sucked from the print head H1001, for cleaning the print head. Further, with the cap M5010 open, the remaining ink is sucked from the cap M5010 to prevent the sticking of the remaining ink and other problems.

(Configuration of Print Head)

Description will be given below of the configuration of the head cartridge H1000 applied according to the present embodiment.

As in the case of the first embodiment, the head cartridge H1000 according to the present embodiment has the print head H1001, the means on which the ink tank H1900 is mounted, and the means for supplying ink from the ink tank H1900 to the print head. The head cartridge H1000 is removably mounted on the carriage M4000.

Figure 13:
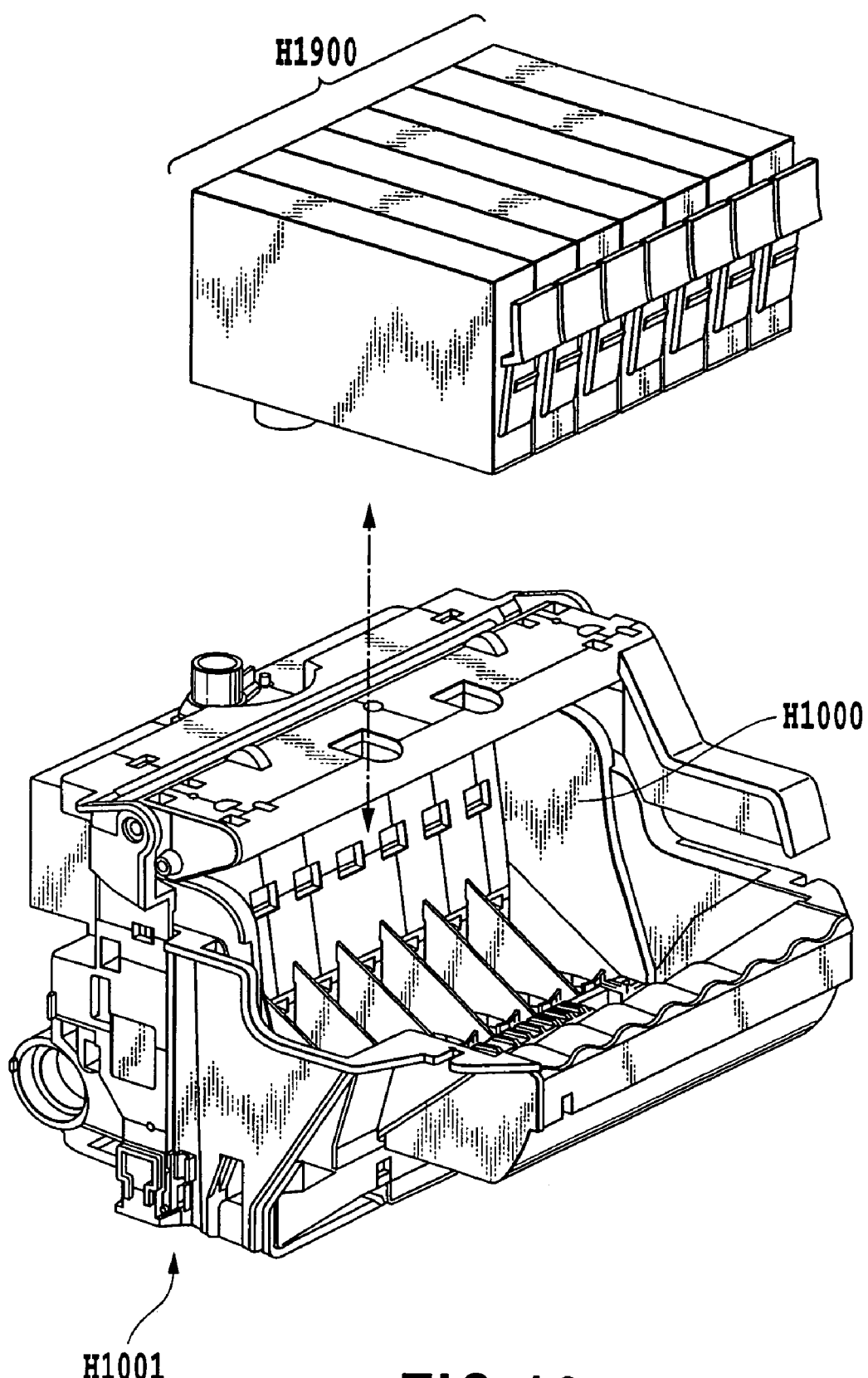
FIG. 13 is a perspective view showing that an ink tank is installed in a head cartridge applied according to the embodiment of the present invention.

In the present embodiment, the ink tank H1900 is installed in the head cartridge H1000 in the same manner as that shown in FIG. 13, already described. However, the printing apparatus according to the present embodiment uses seven color inks of cyan, magenta, yellow, black, red, light cyan, and light magenta to form an image. Accordingly, the ink tank H1900 is provided with independent tanks for the seven colors.

(Inks)

As an essential component, a color material is contained in each of the inks of yellow, magenta, cyan, and black, which are basic colors preferably applicable to the first embodiment of the present invention, and ink of red, which is particular color preferably applicable to the first embodiment of the present invention.

In the first embodiment, a dye or a pigment can be used as a color material for each of the inks of the basic colors (the primary colors, yellow, magenta, and cyan, as well as black). In particular, the due can be suitably used because it is excellent in reproduction of high-lightness colors. Similarly, a dye or a pigment can be used as a color material for the ink of the particular color red. In particular, the due can be suitably used because it is excellent in reproduction of high-lightness colors.

In particular, it is very preferable to use inks that permeate through a print medium after adhesion (dye-based inks markedly exhibit this tendency) rather than those having the color material aggregated on the surface of the print medium (pigment-based inks markedly exhibit this tendency). With the latter inks, most incident light is reflected by the uppermost ink layer, which adheres to the print medium latest. In contrast, with the former inks, incident light is reflected by each of the color ink layers formed inside the print medium. These inks are therefore expected to make the image stereoscopic or clear.

Further, preferably, the particular color inks can effectively express an impactive image with a gamut enlarged by the addition of the particular color ink provided that the inks can express colors of a lightness higher than that of a color reproduction area expressed by combinations of the basic colors.

Specifically, if an image is formed using, for example, the yellow and magenta inks and the particular color ink, then on the CIE-L*a*b* color space, the color expressed by the particular color ink on the print medium has a higher lightness than the color reproduction area expressed by a combination of at least the yellow and magenta inks. Further, the hue angle of the color expressed by the particular color ink on the printed medium corresponds to red such as the one in the color reproduction area. Furthermore, preferably, the color expressed on the print medium by the red ink, which is the particular color ink, has a higher saturation than the color reproduction area.

Cyan Color Materials

C. I. direct blue: 1, 15, 22, 25, 41, 76, 77, 80, 86, 90, 98, 106, 108, 120, 158, 163, 168, 199, 226, 307

C. I. acid blue: 1, 7, 9, 15, 22, 23, 25, 29, 40, 43, 59, 62, 74, 78, 80, 90, 100, 102, 104, 112, 117, 127, 138, 158, 161, 203, 204, 221, 244

Yellow Color Material

C. I. direct yellow: 8, 11, 12, 27, 28, 33, 39, 44, 50, 58, 85, 86, 87, 88, 89, 98, 100, 110, 132, 173

C. I. acid yellow: 1, 3, 7, 11, 17, 23, 25, 29, 36, 38, 40, 42, 44, 76, 98, 99

Magenta Color Material

C. I. direct red: 2, 4, 9, 11, 20, 23, 24, 31, 39, 46, 62, 75, 79, 80, 83, 89, 95, 197, 201, 218, 220, 224, 225, 226, 227, 228, 229, 230

C. I. acid red: 6, 8, 9, 13, 14, 18, 26, 27, 32, 35, 42, 51, 52, 80, 83, 87, 89, 92, 106, 114, 115, 133, 134, 145, 158, 198, 249, 265, 289

C. I. food red: 87, 92, 94

C. I. direct violet 107

It is also possible to use, for example, compounds of the structure described in Japanese Patent Application Laid-open No. 2002-069348.

Black Color Material
C. I. direct black: 17, 19, 22, 31, 32, 51, 62, 71, 74, 112, 113, 154, 168, 195
C. I. acid black: 2, 48, 51, 52, 110, 115, 156
C. I. food black 1, 2

Carbon Black
It is also possible to use, for example, compounds of the structure described in International Publication WO 00/43451.

Red Color Material
C. I. acid orange 7, 10, 33, 56, 67, 74, 88, 94, 116, 142
C. I. acid red 111, 114, 266, 374
C. I. direct orange 26, 29, 34, 39, 57, 102, 118
C. I. food yellow 3
C. I. reactive orange 1, 4, 5, 7, 12, 13, 14, 15, 16, 20, 29, 30, 84
C. I. disperse orange 1, 3, 11, 13, 20, 25, 29, 30, 31, 32, 47, 55, 56

Alternatively, an appropriate mixture of the yellow color material and the magenta color material may be used.

Moreover, inks used in, for example, a personal-use ink jet printing apparatus may contain water as a carrier component, a water-soluble organic solvent for preventing the ink from drying to improve reliability, and a surface active agent, a pH regulator, a preservative, and the like.

Further, specific examples of the light-magenta and cyan color materials can be selected from the cyan and magenta color materials described above, so as to meet the above conditions. The color material for light cyan may be the same as or different from the color material for cyan. This also applies to magenta.

The light cyan and magenta inks have lower color material densities than the cyan and magenta inks, respectively, which are simultaneously used in combination. Moreover, inks used in, for example, a personal-use ink jet printing apparatus may contain water as a carrier component, a water-soluble organic solvent for preventing the ink from drying to improve reliability, and a surface active agent, a pH regulator, a preservative, and the like.

<Other Embodiments>

As described above, the present invention is applicable to a system composed of plural pieces of equipment (for example, a host computer, an interface apparatus, a reader, and a printer) or to an apparatus composed of one piece of equipment (for example, a copier or a facsimile machine).

Further, it is possible to supply software program codes required to realize the functions of the previously described embodiments, to a computer in an apparatus or a system which is connected to various devices in order to operate them so as to realize the functions and operating the various devices in accordance with a program stored in the computer (CPU or MPU) of the system or apparatus.

In this case, the software program codes themselves executing the processes shown in FIG. 1 realize the functions of the previously described embodiments. The program codes themselves, and means for supplying the program codes to the computer, for example, a storage medium storing the program codes, constitute the present invention.

The storage medium storing the program codes may be, for example, a floppy (registered trade mark) disk, a hard disk, an optical disk, a magneto optic disk, a CD-ROM, a magnetic tape, a nonvolatile memory card, or a ROM.

Further, not only if the functions of the previously described embodiments are realized by allowing the computer to execute the supplied program codes but also if the functions of the previously described embodiments are realized by the program codes in cooperation with an OS (Operating System) running on the computer, another application software, or the like, the program codes are of course included in the embodiments of the present invention.

The present invention also includes the case in which the supplied program codes are stored in an expanded board in the computer or an expanded unit connected to the computer and in which a CPU or the like provided in the expanded board or unit then executes a part or all of the actual process on the basis of instructions in the program codes so as to realize the functions of the previously described embodiments.

Furthermore, the image processing apparatus executing the processes shown in FIG. 1 is not limited to a PC such as the previously described one. For example, if any printer executes these processes, it operates as an image processing apparatus. Accordingly, in the application of the present invention, an apparatus that executes these processes or a system composed of plural such apparatuses is considered to be an image processing apparatus.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application No. 2003-291872 filed Aug. 11, 2003, which is hereby incorporated by reference herein.

What is claimed is:

1. A color separation data generation method for generating color separation data, which is used for a printing apparatus and corresponds to printing materials of basic colors, a printing material of a light color having lower color material concentration than a basic color, and a printing material of a particular color except the basic color, for a predetermined gamut,
wherein said method generates the respective color separation data corresponding to the printing material of the particular color, and respective first and second printing materials in respective hues on both sides of a hue in which a particular color is present, at least one of the respective first and second printing materials being a printing material of light color, at a proportion according to lightness in a gamut.

2. A method as claimed in claim 1, wherein the proportion is determined based on a granularity for each lightness.

3. A method as claimed in claim 1, wherein the proportion of the first and second printing materials is greater than a predetermined lightness and not equal to zero.

4. A method as claimed in claim 1, wherein the particular color printing material is red ink.

5. A method as claimed in claim 1, wherein the particular color printing material is red ink and the first and second printing materials are magenta ink and yellow ink respectively.

6. A method as claimed in claim 1, wherein the particular color printing material is blue ink.

7. A method as claimed in claim 1, wherein the particular color printing material is green ink.

8. A method as claimed in claim 1, generating the color separation data using a table having the color separation data as a lattice point data.

9. An image processing apparatus that generates color separation data, which is used for a printing apparatus and corresponds to printing materials of basic colors, a printing material of a light color having lower color material concentration than a basic color, and a printing material of a particular color except the basic color, for a predetermined gamut, wherein said apparatus generates the respective color separation data corresponding to the printing material of the particular color, and respective first and second printing materials in respective hues on both sides of a hue in which a particular color is present, at least one of the respective first and second printing materials being a printing material of light color, at a proportion according to lightness in a gamut.

10. An image processing apparatus as claimed in claim 9, wherein the proportion is determined based on a granularity for each lightness.

11. An image processing apparatus as claimed in claim 9, wherein the proportion of the first and second printing materials is greater than a predetermined lightness and not equal to zero.

12. An image processing apparatus as claimed in claim 9, wherein the particular color printing material is red ink.

13. An image processing apparatus as claimed in claim 9, wherein the particular color printing material is red ink and the first and second printing materials are magenta ink and yellow ink respectively.

14. An image processing apparatus as claimed in claim 9, wherein the particular color printing material is blue ink.

15. An image processing apparatus as claimed in claim 9, wherein the particular color printing material is green ink.

16. An image processing apparatus as claimed in claim 9, generating the color separation data using a table having the color separation data as a lattice point data.

17. A computer-readable medium storing a program stored in a computer readable medium that is used in a information processing apparatus for executing color separation data generation process that generates color separation data, which is used for a printing apparatus and corresponds to printing materials of basic colors, a printing material of a light color having lower color material concentration than a basic color, and a printing material of a particular color except the basic color, for a predetermined gamut, wherein said process generates the respective color separation data corresponding to the printing material of the particular color, and respective first and second printing materials in respective hues on both sides of a hue in which a particular color is present, at least one of the respective first and second printing materials being a printing material of light color, at a proportion according to lightness in a gamut.

* * * * *